(12) United States Patent
Silvestrini (10) Patent No.: US 11,370,365 B2
(45) Date of Patent: Jun. 28, 2022

(54) VEHICLE GLAZING PANEL COMPRISING A BASEPLATE FOR FIXING ACCESSORIES HAVING A METAL PART AND BASEPLATE FOR FIXING ACCESSORIES

(71) Applicant: SAINT-GOBAIN GLASS FRANCE, Courbevoie (FR)

(72) Inventor: Laurent Silvestrini, Bussy (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 308 days.

(21) Appl. No.: 16/612,229

(22) PCT Filed: May 4, 2018

(86) PCT No.: PCT/FR2018/051118
§ 371 (c)(1),
(2) Date: Nov. 8, 2019

(87) PCT Pub. No.: WO2018/206884
PCT Pub. Date: Nov. 15, 2018

(65) Prior Publication Data
US 2021/0138971 A1 May 13, 2021

(30) Foreign Application Priority Data
May 11, 2017 (FR) ...................... 1754120

(51) Int. Cl.
*B60R 11/04* (2006.01)
*B60R 1/12* (2006.01)
*B60R 11/00* (2006.01)

(52) U.S. Cl.
CPC ................ *B60R 11/04* (2013.01); *B60R 1/12* (2013.01); *B60R 2001/1215* (2013.01);
(Continued)

(58) Field of Classification Search
CPC ... B60R 1/12; B60R 11/04; B60R 2001/1215; B60R 2011/0026; B60R 2011/0059; B60R 2011/0063
See application file for complete search history.

(56) References Cited

U.S. PATENT DOCUMENTS

| | | | |
|---|---|---|---|
| 6,250,148 B1 * | 6/2001 | Lynam | ...................... B60R 1/04 73/170.17 |
| 2008/0231704 A1 * | 9/2008 | Schofield | .................. B60R 1/10 348/148 |

(Continued)

FOREIGN PATENT DOCUMENTS

| | | |
|---|---|---|
| WO | WO 2011/103901 A1 | 9/2011 |
| WO | WO 2016/177955 A1 | 11/2016 |

OTHER PUBLICATIONS

International Search Report as issued in International Patent Application No. PCT/FR2018/051118, dated Aug. 30, 2018.

*Primary Examiner* — Mohammed S Rahaman
(74) *Attorney, Agent, or Firm* — Pillsbury Winthrop Shaw Pittman LLP (57) ABSTRACT

A vehicle glazing panel includes a glazed element and a baseplate for the reversible attachment of an internal accessory, such as an internal rearview mirror or an internal display screen, to the glazed element, the baseplate being based on plastics material and having a body, an external face located opposite the internal face of the glazed element, an internal face and a housing for the fixing of a further accessory opposite the internal face of the glazed element, such as a sensor, wherein the baseplate further includes a metal part which has a recessed part located inside the body of the baseplate, an external protruding part which protrudes further to the exterior than the external face of the baseplate and in the direction of the internal face of the glazed (Continued)

element, and an internal protruding part which protrudes further to the interior than the internal face of the baseplate.

22 Claims, 3 Drawing Sheets

(52) U.S. Cl.
CPC ............... *B60R 2011/0026* (2013.01); *B60R 2011/0059* (2013.01); *B60R 2011/0063* (2013.01)

(56) References Cited

U.S. PATENT DOCUMENTS

| | | | |
|---|---|---|---|
| 2014/0041308 A1* | 2/2014 | Grandgirard | ............ E06B 3/32 49/399 |
| 2015/0327398 A1 | 11/2015 | Achenbach et al. | |
| 2016/0167667 A1* | 6/2016 | DeWard | ................. B60R 11/04 348/373 |

* cited by examiner

VEHICLE GLAZING PANEL COMPRISING A BASEPLATE FOR FIXING ACCESSORIES HAVING A METAL PART AND BASEPLATE FOR FIXING ACCESSORIES

CROSS-REFERENCE TO RELATED APPLICATIONS

This application is the U.S. National Stage of PCT/FR2018/051118, filed May 4, 2018, which in turn claims priority to French patent application number 1754120 filed May 11, 2017. The content of these applications are incorporated herein by reference in their entireties.

The present invention relates to the fixing of accessories to vehicle glazing panels and more particularly to motor vehicle glazing panels.

One or more accessories are usually fixed to the internal face of a glazing panel, such as a windshield, within the passenger compartment of a vehicle.

The accessories are, for example, a rearview mirror, a rain sensor and/or light sensor or even a detector or a camera or a display screen.

The accessories are mounted onto the glazing panel using a support such as a plate and/or a baseplate and/or a mounting plate which is (or are) in each case usually fixed onto the internal face of a glazed element of the vehicle glazing panel, one (or more) of the accessories being mechanically attached thereto.

The accurate positioning and the accurate fixing of the plate, the baseplate and the mounting plate onto the internal face of the glazed element thus permits an accurate positioning and attachment of the accessory onto, or partially onto, this internal face of the glazed element.

The support is usually made of plastics material, the internal face thereof being provided with shapes for cooperating with the accessories which are to be mounted and which may be fixed by clipping, for example. The support is fixed to the internal face of the glazing panel by an adhesive bonding operation, such as by means of a polymerizable adhesive or double-sided adhesive means.

Some accessories are not manually accessible to the users of the vehicle, such as for example the sensors.

However, some accessories require particularly robust fixing interfaces since these accessories are designed to be handled from inside the vehicle by the users of the vehicle. It is appropriate to call these accessories "internal accessories", such as for example the internal rearview mirrors or the internal display screens.

Currently, the supports which are used for fixing such internal accessories are entirely metal supports; these supports are bases or metal plates, made of metal or a metal alloy. The external face of the metal plate is covered over its entire surface by adhesive means for adhesively bonding the plate onto the internal face of the glazed element. The internal face of the plate is designed so as to comprise metal fixing elements.

The prior art discloses, in particular in the international patent application WO 2011/103901, such a metal baseplate or mounting plate, referenced 16 in this document.

More specifically, it is not conceivable to provide a support made of plastics material (even made of fiber-reinforced plastics material) for such internal accessories, since over time the plastics material would not withstand the stresses to which the internal accessory is subjected during the use thereof.

Moreover, it is known to produce a support based on plastics material for one or more accessories, none of said accessories being an "internal accessory" within the meaning disclosed above.

The international patent application WO 2016/177955 thus proposes a glazing panel with a baseplate and a plate in a single piece which is based on plastics material for fixing a plurality of non-internal accessories.

Hitherto, when it was anticipated to fix both a metal support (for an internal accessory) and a support based on plastics material onto the internal face of a glazed element, it was necessary to provide and control the use of two separate adhesive materials since the adhesive material authorized for a metal support was not authorized for supports based on plastics material and vice versa, and the authorized adhesive material for a support based on plastics material was not authorized for metal supports.

Moreover, the method for manufacturing a glazing panel onto which supports have to be fixed, said supports permitting different accessories to be fixed, is awkward and lengthy, requiring different types of supports made of plastics and made of metal, involving separate adhesive bonding steps associated with the different types of adhesive and polymerization times, and requiring separate fixing stages in a production line.

The object of the present invention is to propose a support based on plastics material for fixing at least one internal accessory, in particular for fixing an internal accessory with a metal interface, which does not have the aforementioned drawbacks and, in particular, makes it possible to simplify the method for manufacturing a glazing panel to be provided with supports for the fixing of a plurality of accessories, including at least one internal accessory.

The present invention relates to a vehicle glazing panel as claimed in claim 1. The dependent claims have advantageous features.

This vehicle glazing panel comprises at least one glazed element and at least one baseplate for the reversible attachment of at least one internal accessory such as an internal rearview mirror or an internal display screen to said glazed element, said baseplate being based on plastics material and having a body, an external face located opposite the internal face of said glazed element, an internal face and a housing for the fixing of a further accessory opposite the internal face of said glazed element, such as a sensor.

The glazing panel according to the invention is noteworthy in that said baseplate further comprises a metal part which has:
- at least one recessed part located inside the body of said base, and preferably two recessed parts both located inside the body of said base,
- at least one external protruding part which protrudes further to the exterior than said external face of said baseplate and in the direction of the internal face of said glazed element and preferably two external protruding parts, which both protrude further to the exterior than said external face of said baseplate and in the direction of the internal face of said glazed element, and
- at least one internal protruding part which protrudes further to the interior than said internal face of said base.

In the remainder of the description the terms "interior" and "exterior" are understood to qualify the relevant parts of the support in the installed position of the support in its final destination, i.e. fixed onto an internal face of a glazed element of a vehicle glazing panel which is itself installed in a bodywork opening of the vehicle, the term "interior"

qualifying a part facing the interior of the vehicle whilst "exterior" qualifies a part opposite the exterior of the vehicle.

The concept of being "based on plastics material" means that the essential constituent of the material constituting the element (the baseplate) is made of plastics material; this concept aims to encompass the fact that this plastics material may be reinforced, for example, by mixing reinforcing fibers therein and, in particular, glass fibers; but excludes the fact that the material constituting the element (the baseplate) is itself metal, i.e. made of metal or a metal alloy.

Thus, the internal protruding part(s) contribute(s) to a fixing interface for the mechanical fixing of the internal accessory (or each internal accessory if there are a plurality thereof) and due to the other parts of the recessed metal part(s) and external protruding part(s) an enhanced mechanical cooperation with the baseplate is further provided, permitting a very strong fixing interface to be provided.

Thus it is the internal protruding part(s) of the metal part which enable an internal accessory to be fixed, in the case of an internal accessory where the fixing terminal thereof is preferably itself metal: made of metal or a metal alloy.

In a variant which is particularly robust whilst being compact, said metal part has:
  only two recessed parts located inside the body of said base,
  only two external protruding parts both protruding further to the exterior than said external face of said baseplate and in the direction of the internal face of said glazed element, and
  a single internal protruding part which protrudes further to the interior than said internal face of said base.

The metal part consists of a metal or a metal alloy; it does not comprise plastics material. The metal part is preferably made of aluminum, Zamak, steel or stainless steel; however it may be covered partially or completely by a layer of paint or a coat of varnish or priming layer increasing the cohesion with the plastics material of the base.

Preferably, the metal part is fixed in a non-removable manner to the baseplate which is based on plastics material. Preferably, the metal part is an insert overmolded with the part made of plastics material of the element for fixing, i.e. an insert overmolded with the base.

In a variant which is not preferred, the metal part is attached to the baseplate subsequent to the manufacture of the base. In such a variant, the baseplate preferably has a shape adapted for a mutual mechanical cooperation with the metal part, preferably without requiring a tool.

Advantageously, the body of the baseplate has an external face which follows the planar shape or curve of the surface of the glazed element onto which the baseplate is designed to be fixed.

In a particularly robust variant, whilst being particularly compact, two recessed parts are located on either side of said housing for fixing a further accessory and/or two external protruding parts are located on either side of said housing for fixing a further accessory.

Preferably, said external protruding part is in contact with the internal face of said glazed element and preferably the two external protruding parts or all of the external protruding parts are in contact with the internal face of said glazed element; the contact is direct, in particular without the interposition of adhesive material.

Whilst the contact of a metal part with a surface of a glazed element is not recommended, in particular when it is made of glass, this configuration of the baseplate which is based on plastics material, combined with a metal interface part for fixing an internal accessory which is placed in contact with the internal face of the glazed element, surprisingly results in an improvement in the retention of the internal accessory and reduces very significantly, or even eliminates, the vibrations usually present in the region of the internal accessory during the operation of the vehicle.

Said baseplate is preferably attached to said glazed element using an adhesive material, in particular using a layer of adhesive or at least one double-sided adhesive pad, preferably with at least one, and further preferably two, external protruding part(s) which has (have) in each case a thickness which is identical to the thickness of said adhesive material.

Said internal protruding part is an interface for fixing by clipping or by stapling or by fitting or by a quarter-turn rotation and preferably constitutes an interface for fixing a foot of an internal rearview mirror or an internal display screen. Preferably, it is not an interface for fixing by a screw connection: the metal part thus comprises neither a threaded portion nor a tapped portion for the fixing thereof to the base.

Said metal part is preferably a part in one piece, in order to have increased mechanical strength, and further preferably has an arcuate shape to facilitate the attachment of said accessory with two lateral feet which are connected by a dome, said dome belonging at least partially to said internal protruding part and preferably each of the feet protruding further to the exterior than said external face of said baseplate and in the direction of the internal face of said glazed element.

In a specific variant, said baseplate is mechanically connected by at least one connecting arm which is made of plastics material and which connects said baseplate to a plate, and preferably said baseplate is mechanically connected by a plurality of connecting arms.

When said baseplate is mechanically connected by at least one connecting arm made of plastics material to a plate, the connecting arm(s) is (or are) preferably relatively flexible in order to permit the alteration to the orientation/arrangement of the baseplate in the three spatial directions relative to the plate.

The connecting arm(s) between the baseplate and the plate advantageously make(s) it possible, during the installation of the plate and the baseplate on a glazed element, to produce an accurately adjusted connection between the glazed element and the at least two accessories which are attached to this glazed element by means of the baseplate and the plate.

For further details on these connecting arms and their advantages, reference may be made to the international patent application WO 2016/177955 in the name of the applicant.

Preferably, said further accessory which is designed to be fixed to the baseplate by said housing opposite the internal face of said glazed element is an "accessory oriented outwardly" in the sense of where it has to be positioned with a part oriented toward the exterior of the vehicle; for example it may be a sensor designed to collect information from the exterior.

The invention also relates to a baseplate for fixing accessories, for the fixing of a plurality of accessories to the glazing panel according to the invention, said baseplate comprising a metal part which has:
  at least one recessed part, and preferably two recessed parts, located inside the body of said base,
  at least one external protruding part, and preferably two external protruding parts, which protrude(s) further to the exterior than said external face of said baseplate and in the direction of the internal face of said glazed element, and at least one internal protruding part which protrudes further to the interior than said internal face of said baseplate and participates in a fixing interface for the mechanical fixing of the internal accessory.

The present invention is disclosed hereinafter by means of illustrative examples of embodiments of the invention and from the accompanying drawings, in which.

In these figures, the proportions between the different elements are respected in each figure but the elements in the background are not generally shown in order to facilitate the reading thereof.

The present invention relates to a support for fixing a plurality of accessories to a glazed element such as a glass substrate of a vehicle glazing panel, in particular of a motor vehicle glazing panel; this vehicle glazing panel may be, in particular, a windshield.

This support is designed to permit a plurality of accessories to be attached mechanically and reversibly.

Figure 5:
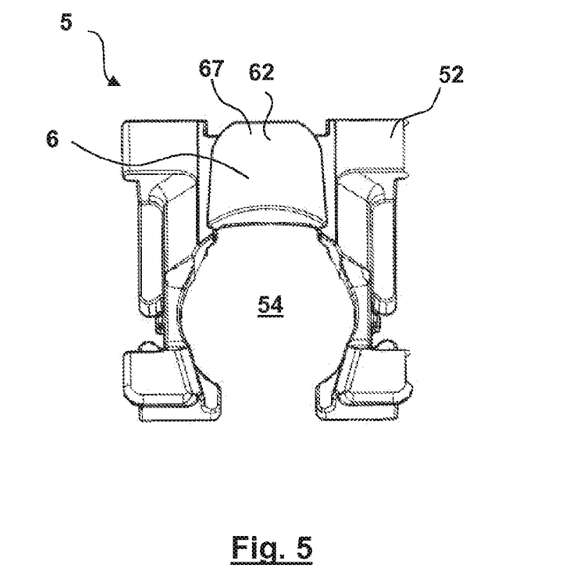
FIG. 5 is a view of a baseplate for fixing accessories.

This support may permit only two accessories to be attached: thus it is a single baseplate 5, as illustrated for example in FIG. 5.

This support may permit at least three accessories to be attached: thus it is a baseplate 5 with a plate 3, as illustrated for example in FIGS. 1 to 4.

This support in the form of a single baseplate 5 or a baseplate 5 with a plate 3 has to permit the reversible attachment to a glazed element of at least one specific accessory, called an "internal accessory" since it is accessible to a user of the vehicle (a user located inside the vehicle); it is a useful accessory which is used directly by a user of the vehicle and, in particular, an internal mirror designed for the view of the driver to the rear of the vehicle, called a "rearview mirror", or even an internal display screen, for example designed for the same purpose.

This internal accessory has a suitable shape and comprises fixing means for the fixing thereof in a removable manner to the support and, in particular, metal fixing means.

This support has to permit the reversible attachment to the glazed element of at least one further accessory and thus to this end comprises a housing; this further accessory is not an internal accessory in the above sense; this further accessory could be qualified as an "accessory oriented outwardly" in the sense of where it has to be positioned, with a part oriented toward the exterior of the vehicle; for example, this may be a sensor designed to collect information from the exterior.

Figure 1:
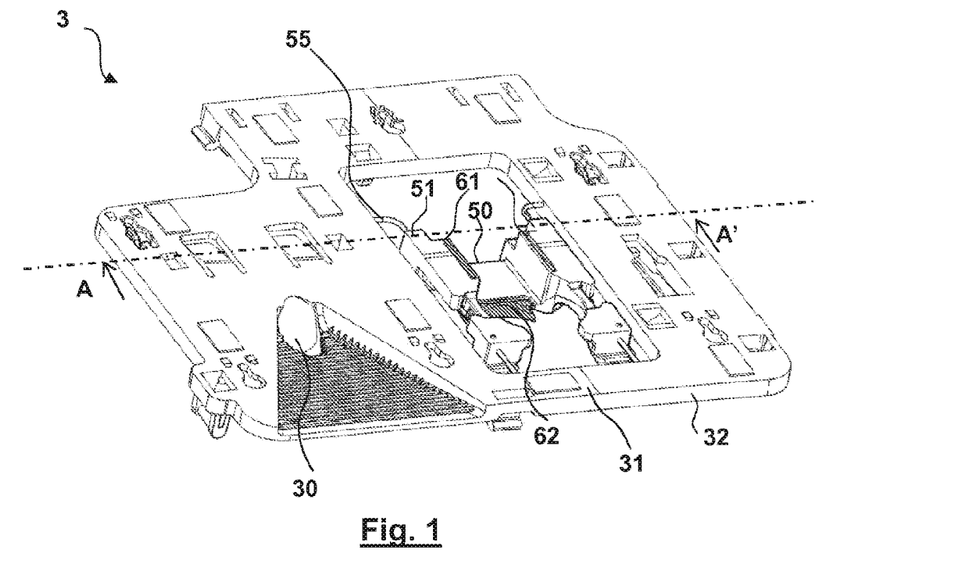
FIG. 1 is a perspective bird's eye view of a support according to the invention for fixing accessories to be mounted on a glazed element, the support being illustrated according to its internal face.
Figure 2:
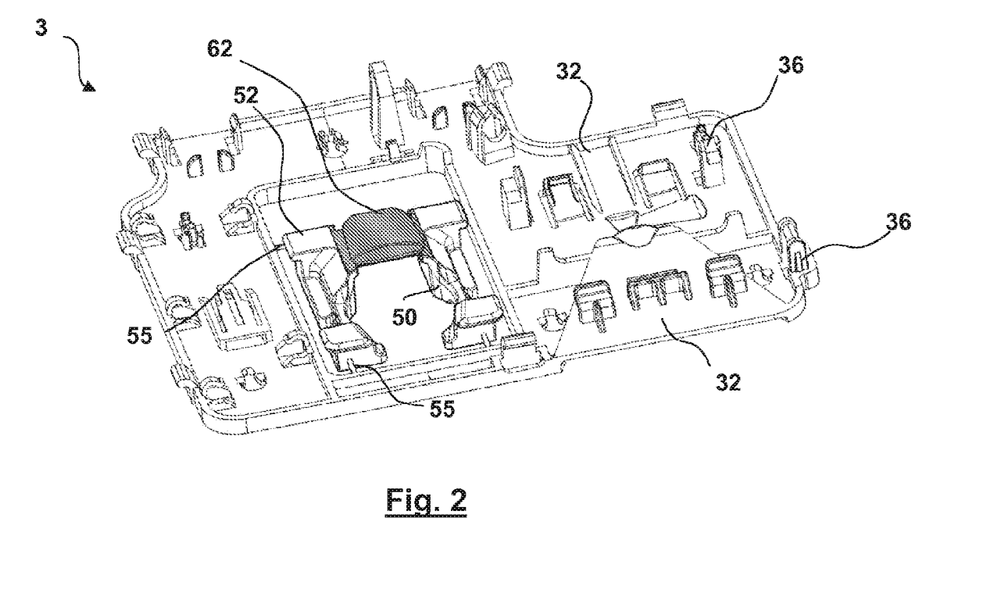
FIG. 2 is a perspective view of the support of FIG. 1 showing the internal face.
Figure 3:
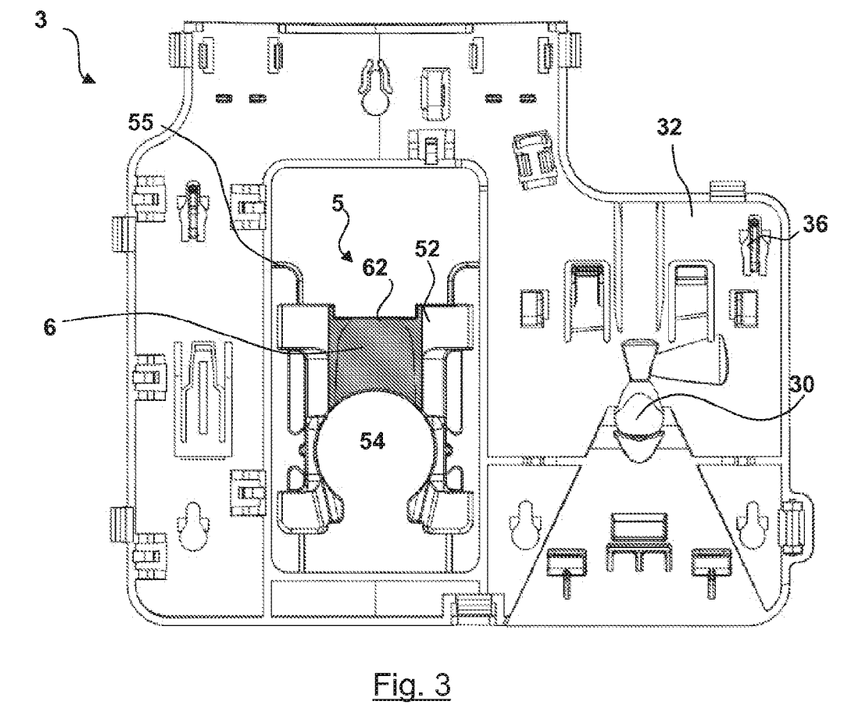
FIG. 3 is a front view of the internal face of the support of FIG. 1.

FIG. 3 makes it possible to understand clearly the interactions which permit the invention to be implemented since it shows a vehicle glazing panel 1, illustrated partially and in cross section, this glazing panel comprising at least one glazed element 2 and at least one baseplate 5 for the reversible attachment of an internal accessory, such as an internal rearview mirror, to said glazed element 2.

The glazing panel 1 is designed to close an opening which forms a separation between an internal space 1 located inside the vehicle and an external space E located outside the vehicle. The glazed element 2 thus has an external face 21 designed to be turned toward the external space, an internal face 22 designed to be turned toward the internal space, as well as a narrow peripheral edge.

The glazed element 2 may be monolithic or not, consisting of a substrate of a single material, or a plurality of substrates of material, one or more films of adhesive material being interposed therebetween in the case of laminated glazing panels. The substrate(s) of material may be made in a mineral material, in particular glass, or organic material, in particular plastics material. The glazing panel may be an insulated glazing panel, i.e. comprising at least two monolithic or laminated substrates, separated by a gas layer.

The glazed element 2 may be planar or convex.

The baseplate 5 is based on plastics material and has a body 50, an external face 51 located opposite the internal face 22 of the glazed element, an internal face 52 turned toward the interior and a housing 54 for the fixing of a further accessory (which in this case is not an internal accessory) opposite the internal face 22 of the glazed element.

The body 50 is located between the external face 51 and the internal face 52; it denotes the constituent material of the baseplate which is located between its two faces and which is covered by these faces.

The housing 54 is a location of the baseplate 5 without the constituent material of the base: it is a hollow or a hole having a particular shape since it is designed to permit the reversible attachment of an accessory other than the aforementioned internal accessory: this accessory may, in particular, be an internal accessory such as a sensor and, in particular, an optical sensor, such as for example an optical rain sensor or a light sensor.

In other words, the invention does not fall within the technical field of single supports, or bases, i.e. bases only permitting the fixing of just one accessory, but specifically within the technical field of supports for fixing a plurality of accessories, at least one thereof being an internal accessory. This field is specific in the sense that the internal accessory is subjected to increased stresses, in particular mechanical stresses, due to its accessibility and its direct use by the user of the vehicle, and it is necessary for its attachment to the baseplate to be strong, whilst at the same time being removable.

Moreover, the invention falls within the technical field of supports having at least one housing for receiving and fixing an accessory which is oriented outwardly and which comprises a part turned toward the exterior, for a particular purpose.

In the glazing panel according to the invention it is proposed that the baseplate 5 further comprises a metal part 6 which has:

at least one recessed part 60 and preferably two recessed parts 60, which is located or which are located in each case entirely inside the body 50 of the baseplate 5, at least one external protruding part 61 and preferably two external protruding parts 61 which protrude further to the exterior than the external face 51 of the baseplate 5 and in the direction of the internal face 22 of the glazed element and at least one internal protruding part 62 which protrudes further to the interior than the internal face 52 of the baseplate 5.

These at least three parts, even at least four parts, even at least five parts, of the metal part thus permit the attachment of the internal accessory in a reliable, accurate and fixed manner.

The metal part 6 is designed to constitute an interface for fixing the internal accessory in the sense that the internal accessory is at least partially attached to the baseplate by means of the metal part.

It is possible that the internal accessory is attached to the baseplate solely by means of the metal part but it is also possible that the internal accessory is attached partially to the metal part 6 and partially to the body 50; this second attachment may be made by clipping, for example.

The baseplate 5 is made of plastics material or is based on plastics material further incorporating at least one reinforcement, such as for example fibers and in particular glass fibers, and may be manufactured for example by molding. In this case, it is particularly expedient to provide that the metal part is integrated in the baseplate during the molding of the base.

In a preferred embodiment, the metal part 6 is not removable without altering the integrity of the baseplate 5. Preferably, the metal part 6 constitutes an insert which is overmolded with the body 50. The recessed part 60 is located in the body 50 and the protruding parts 61, 62 are located outside the body 50.

The internal protruding part 62 thus constitutes an interface for the fixing of the internal accessory.

This fixing is extremely reliable due to the fact that the forces to which the internal protruding part 62 is subjected during the fixing of the internal accessory and during its use (in particular when its position is altered by the user) are transmitted to the recessed part and to the external protruding part or parts.

Figure 4:
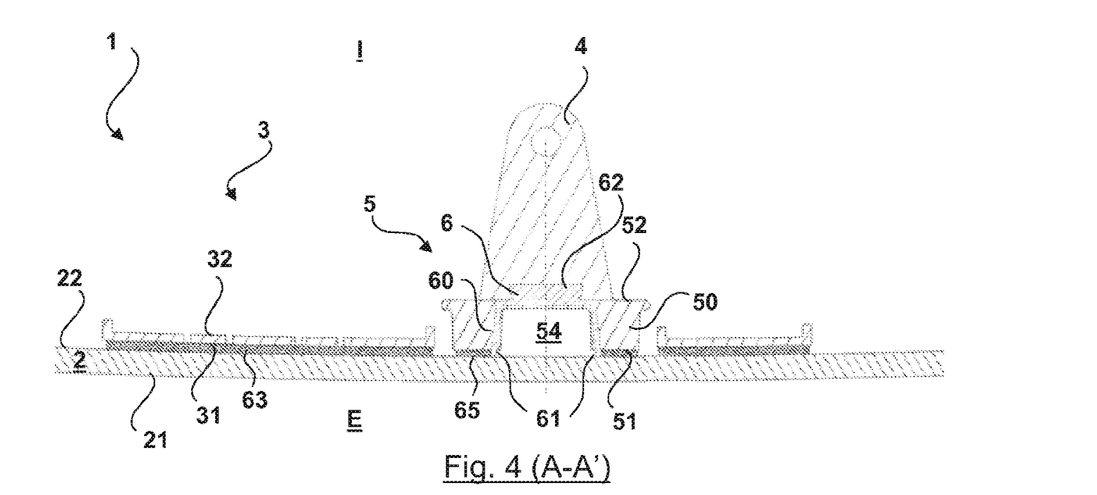
FIG. 4 is a sectional view along AA' of FIG. 1 also illustrating the adhesion of the support on an internal face of a glazed element of a glazing panel.

For example, with reference to FIG. 4 in which the reference numeral 4 denotes a foot of an internal rearview mirror which is attached to the baseplate 5 using the metal part 6, it is possible to observe that any force on the foot of the rearview mirror toward the interior will be distributed into the body 50 of the baseplate due to the recessed part 60 and into the external surface 51 of the baseplate due to the two external protruding parts 61.

For an improved distribution of the forces, the metal part 6 preferably has a central plane of symmetry which is illustrated by the dashed lines in FIG. 4; further preferably the baseplate 5 also has a central plane of symmetry which is illustrated by the dashed lines in FIG. 4.

Moreover, the vibrations of the vehicle which might be capable of being transmitted to the internal accessory by the fixing of this accessory are attenuated by the difference in the type of materials:

between the baseplate which is based on plastics material, and the metal part which is made of metal or a metal alloy.

The two recessed parts 60 are located on either side (on each side of the plane of symmetry illustrated by the dashed lines) of the housing 54 and the two external protruding parts 61 are located on either side (on each side of the plane of symmetry illustrated by the dashed lines) of the housing 54 for the other accessory in order to improve further the distribution of forces in the base.

Each external protruding part 61 thus constitutes the extension on the outside of the body 50 of each recessed part 60.

Quite specifically in FIG. 4, the two external protruding parts 61 are both in contact with the internal face 22 of the glazed element 2: they touch this internal face; whilst it is generally preferred to avoid any direct contact between a metal part and a glazed element, in particular when it is made of glass, the inventors have noticed in a completely surprising manner that in the specific case of the metal part, as disclosed here, this contact may contribute to increasing the rigidity of the fixing of the internal accessory and, as a result, may participate in the reduction of vibrations, or even permit the elimination of vibrations, to which the internal accessory is otherwise subjected.

The surprising result of this contact between an external protruding part (or a plurality of parts) 61 and the internal face 22 of the glazed element 2 is that the internal accessory vibrates less due to the effect of the displacement of the vehicle. If it is an internal rearview mirror, the view through this rearview mirror is thus more stable; if it is a display screen, the image produced by this screen is more stable.

FIG. 4 also shows that the baseplate 5 is attached to the glazed element 2 using an adhesive material 65, in particular using a layer of adhesive or at least one double-sided adhesive pad; this adhesive material is thus interposed, with contacts, between the internal face 22 of the glazed element 2 and the external face 51 of the baseplate 5.

The two external protruding parts 61 each have an identical thickness to the thickness of this adhesive material 65. The two external protruding parts are thus able to permit the thickness of this adhesive material 65 to be controlled.

The internal protruding part 62 is an interface for fixing by clipping or by stapling or by fitting or by a quarter-turn rotation and thus preferably constitutes an interface for fixing a foot of a rearview mirror or a display screen.

Figure 6:
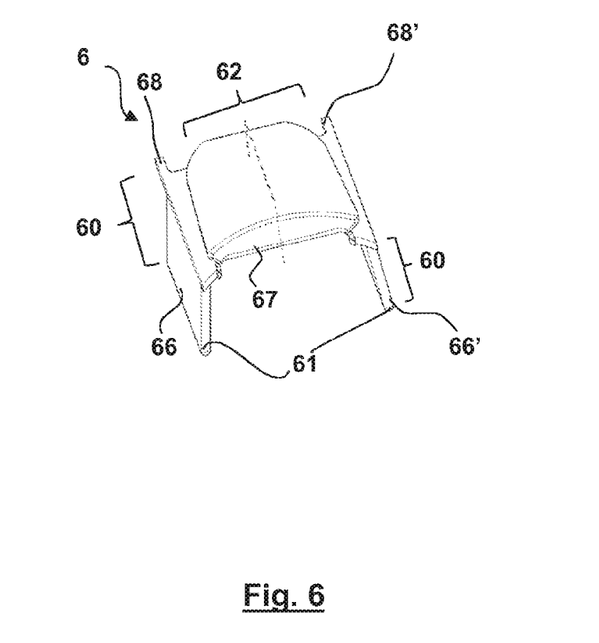
FIG. 6 is a perspective view showing simply the metal part which is used for the support of FIGS. 1 to 4 or for the baseplate of FIG. 5.

FIG. 6 shows the metal part 6 in detail; it is a part in one piece in order to have increased mechanical strength per se and preferably has an arcuate shape or U-shape to permit an effective distribution of forces. The plane of symmetry of the metal part 6 is illustrated in dashed lines; it is transverse with an arcuate shape.

The metal part 6 has two lateral feet 66, 66' which are connected by a dome 67. The dome 67 belongs at least partially to the internal protruding part 62 and in this case the dome 67 belongs entirely to the internal protruding part 62. The dome is preferably in one piece but may possibly be perforated if this is necessary to improve the fixing of the internal accessory.

In this case, each of the lateral feet 66, 66' also protrudes further to the exterior than the external face 51 of the baseplate 5 (and in the direction of the internal face 22 of the glazed element 2 when the orientation of the metal part relative to the baseplate and relative to the glazed element is considered).

The two recessed parts 60, the two external protruding parts 61 and the internal protruding part 62 are shown in this FIG. 6 in order to permit them to be located when the metal part 6 is observed alone; however these five parts are only able to be observed when the baseplate partially incorporates this metal part since they are defined relative to this base.

The lateral feet 66, 66' are opposite one another and each extend at an angle greater than 90°, for example 100°, relative to a general plane of the dome 67, in order to increase further the mechanical strength.

The mounting/fixing of the foot of the rearview mirror is advantageously made by fitting the foot along two opposing slides 68, 68' located at the lateral ends of the dome. These slides 68, 68' also belong entirely to the internal protruding part 62. The dome 67 and the slides 68, 68' together constitute the internal protruding part 62.

By way of example, the thickness of the dome at the thickest is in the order of 3 mm, the width of the dome between the two lateral feet is in the order of 26 mm, and the overall length of the metal part (which is also the length of the slides) is in the order of 32 mm; the thickness of the lateral feet is in the order of 1 mm.

In a variant not illustrated, each lateral foot is divided into a plurality of parts, in particular into two parts, to increase further the grip of the recessed parts in the body 50.

FIG. 5 shows a single baseplate 5 which as such is able to be used for the fixing of two accessories to the glazed element, and only two accessories:
- an internal accessory at least partially fixed to the baseplate 5 by means of the internal protruding part 62, and
- a further accessory, or accessory oriented outwardly, fixed in the housing 54.

The dome 67 of the metal part 6 is cut out in a circular arc shape in order to permit the positioning of the other accessory in the housing 54 and the removal of this other accessory from the housing 54, whilst keeping the baseplate 5 attached to the glazed element, i.e. without having the need to remove the baseplate 5.

When the general U-shape of the metal part 6 is observed, the concavity is oriented to the interior.

The baseplate 5 may be fixed by the adhesive material to the internal face 22 of the glazed element.

The accessories are reversibly attachable and may be selected from a list, comprising: a rain sensor, a light sensor, a photographic sensor (apparatus for capturing a fixed image in the visible domain; analog or digital), an infrared sensor, a camera (apparatus for capturing a moving image in the visible domain; analog or digital), a rearview mirror support, a display screen support.

FIGS. 1 to 4 show a baseplate 5 which is identical to that of FIG. 5 and which is also connected to a plate 3 for the fixing of at least one additional accessory (or at least three accessories) to the glazed element:
- an internal accessory at least partially fixed to the baseplate 5 by means of the internal protruding part 62,
- a further accessory, or accessory oriented outwardly, fixed in the housing 54, and
- an additional accessory, or additional accessory oriented outwardly, fixed opposite a hole 30.

The plate 3 comprises, on the one hand, an external face 31 which is designed to be turned toward the exterior and which is designed to be indirectly fixed to the internal face 22 of the glazed element opposite this internal face of the glazed element and, on the other hand, an internal face 32 designed to be turned toward the interior.

The plate further comprises elements 36 (clipping holes) for the reversible attachment of an internal cover.

In FIGS. 1 to 4, the baseplate 5 is mechanically connected by at least one connecting arm 55 which is made of plastics material and which connects said baseplate 5 to a plate 3, and preferably by a plurality of connecting arms 55 (in this case four) in the manner known from the international patent application WO 2016/177955 in the name of the applicant.

The assembly formed by the baseplate 5, the metal part 6, the connecting arms 55 and the plate 3 is preferably manufactured by molding in a single operation and with very high degree of precision.

The single part which comprises at least the baseplate 5, the metal part 6, the connecting arms 55 and the plate 3 is fixed to the internal face 22 of the glazed element by an automatic, semi-automatic or manual procedure.

The plate 3 and the baseplate 5 may be respectively fixed (FIG. 4) by two separate adhesive materials 53 and 55 to the internal face 22 of the glazed element; they may also be fixed by the same adhesive material. This material or these materials may be a double-sided adhesive strip or an adhesive. The thickness of the adhesive material is in the order of 0.5 to 1 mm.

Naturally, this adhesive material is arranged on the respective external face of the plate 3 and the baseplate 5 such that the hole 30 and the housing 54 are both devoid of adhesive material.

In a variant not illustrated, the metal part 6 may be removably connected to the baseplate 5; the body 50 then comprises, for example, two opposing slots, each designed to receive a lateral foot 66, 66' by engagement/clipping.

The invention claimed is:

1. A vehicle glazing panel comprising at least one glazed element and at least one baseplate configured to reversibly attach at least one internal accessory to said glazed element, said baseplate being based on plastics material and having a body, an external face located opposite to an internal face of said glazed element, an internal face and a housing for fixing a further accessory opposite to the internal face of said glazed element, wherein said baseplate further comprises a metal part which includes:
   at least one recessed part located inside the body of said baseplate,
   at least one external protruding part which protrudes further to the exterior than said external face of said baseplate and in a direction of the internal face of said glazed element, and
   at least one internal protruding part which protrudes further to the interior than said internal face of said baseplate.

2. The vehicle glazing panel as claimed in claim 1, wherein two recessed parts are located on either side of said housing or two external protruding parts are located on either side of said housing, or both.

3. The vehicle glazing panel as claimed in claim 1, wherein said at least one external protruding part is in contact with the internal face of said glazed element.

4. The vehicle glazing panel as claimed in claim 1, wherein said baseplate is attached to said glazed element using an adhesive material.

5. The vehicle glazing panel as claimed in claim 1, wherein said internal protruding part is an interface for fixing by clipping or by stapling or by fitting or by a quarter-turn rotation.

6. The vehicle glazing panel as claimed in claim 1, wherein said metal part is a part in one piece.

7. The vehicle glazing panel as claimed in claim 1, wherein said baseplate is mechanically connected by at least one connecting arm which is made of plastics material and which connects said baseplate to a plate.

8. A baseplate for fixing accessories, for the fixing of a plurality of accessories to the glazing panel as claimed in claim 1, said baseplate comprising a metal part which includes:
   at least one recessed part located inside the body of said baseplate,
   at least one external protruding part which protrudes further to the exterior than said external face of said baseplate and in the direction of the internal face of said glazed element, and
   at least one internal protruding part which protrudes further to the interior than said internal face of said baseplate.

9. The vehicle glazing panel as claimed in claim 1, wherein the at least one internal accessory is an internal rearview mirror or an internal display screen.

10. The vehicle glazing panel as claimed in claim 1, wherein the metal part includes two recessed parts located inside the body of said baseplate.

11. The vehicle glazing panel as claimed in claim 1, wherein the further accessory is a sensor.

12. The vehicle glazing panel as claimed in claim 1, wherein the metal part includes two external protruding parts which protrude further to the exterior than said external face of said baseplate and in the direction of the internal face of said glazed element.

13. The vehicle glazing panel as claimed in claim 12, wherein the two external protruding parts are in contact with the internal face of said glazed element.

14. The vehicle glazing panel as claimed in claim 4, wherein said baseplate is attached to said glazed element a layer of adhesive or at least one double-sided adhesive pad.

15. The vehicle glazing panel as claimed in claim 4, wherein the at least one external protruding part has a thickness which is identical to a thickness of said adhesive material.

16. The vehicle glazing panel as claimed in claim 5, wherein said internal protruding part constitutes an interface for fixing a foot of an internal rearview mirror or an internal display screen.

17. The vehicle glazing panel as claimed in claim 6, wherein said metal part has an arcuate shape with two lateral feet which are connected by a dome, said dome belonging at least partially to said internal protruding part.

18. The vehicle glazing panel as claimed in claim 17, wherein each of the two lateral feet which protrudes further to the exterior than said external face of said baseplate and in the direction of the internal face of said glazed element.

19. The vehicle glazing panel as claimed in claim 7, wherein said baseplate is mechanically connected by a plurality of said connecting arms.

20. The baseplate as claimed in claim 8, wherein the metal part includes two recessed parts located inside the body of said baseplate.

21. The baseplate as claimed in claim 8, wherein the metal part includes two external protruding parts which protrude further to the exterior than said external face of said baseplate and in the direction of the internal face of said glazed element.

22. The vehicle glazing paned as claimed in claim 1, wherein the metal part is overmolded with the body of the baseplate.

* * * * *